United States Patent

Graf

[15] 3,648,153

[45] Mar. 7, 1972

[54] REFERENCE VOLTAGE SOURCE

[72] Inventor: Stefano Arturo Graf, Somerville, N.J.

[73] Assignee: RCA Corporation

[22] Filed: Nov. 4, 1970

[21] Appl. No.: 86,872

[52] U.S. Cl. ....................................323/1, 307/297, 323/19
[51] Int. Cl. ....................................................G05f 1/60
[58] Field of Search ....................307/296, 297; 323/1, 4, 16, 323/19, 22 T, 38, 39

[56] References Cited

UNITED STATES PATENTS 3,522,521 8/1970 Lloyd ....................................323/22 T
3,534,245 10/1970 Limberg ....................................323/4

*Primary Examiner*—A. D. Pellinen
*Attorney*—Eugene M. Whitacre

[57] ABSTRACT

A temperature compensated reference voltage source is provided which is suitable for fabrication using integrated circuit techniques. A constant current source is coupled via first and second current paths to a reference terminal. Each of the first and second current paths includes one or more diodes. A current repeater circuit, which includes a further diode and a transistor having proportionally related conduction characteristics, is coupled between the two current paths and the reference terminal to provide substantially constant currents in each of the first and second paths. The currents are selected so that a difference voltage, produced across the emitter-collector electrodes of the transistor of the repeater circuit, is substantially constant as a function of temperature.

10 Claims, 2 Drawing Figures

Figure 1:
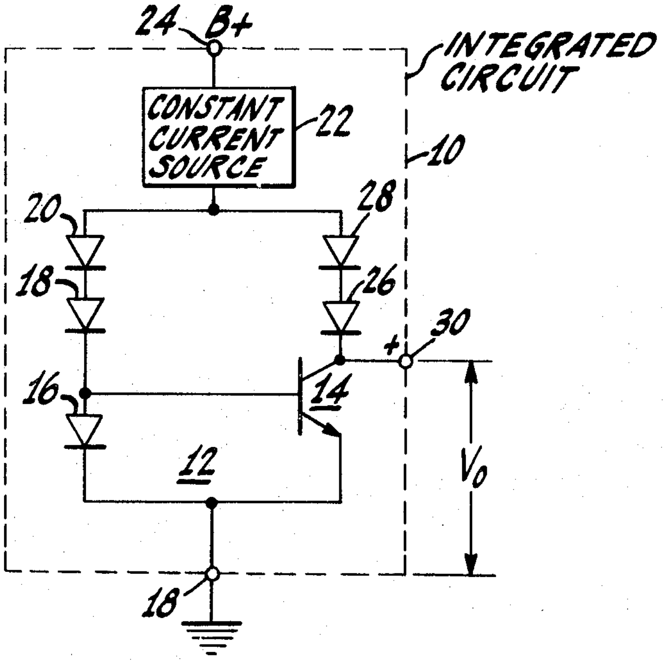

INVENTOR.
STEFANO A. GRAF
BY
Kenneth R. Schaefer
Attorney

REFERENCE VOLTAGE SOURCE

This invention relates to reference voltage sources, and more particularly to a temperature compensated reference voltage source suitable for on a monolithic integrated circuit chip.

The term integrated circuit as used herein refers to a unitary or monolithic semiconductor structure or chip incorporating the equivalent of a network of interconnected active and passive circuit elements such as transistors, diodes, resistors, capacitors and the like.

In the design of electrical circuits, it is often necessary to provide a stable reference voltage with which other electrical quantities are to be compared. For example, voltage regulators commonly employ a relatively low-level, stable reference voltage against which a portion of a higher level operating voltage is compared. It is frequently desirable that the reference voltage substantially invariant as a function of temperature. Furthermore, in integrated circuitry, it is usually desirable to provide such a reference voltage without undue power dissipation and at a relatively low-voltage level because of the power and voltage handling limitations of integrated circuitry.

Numerous techniques have been employed in the past to accomplish the general objective of a temperature compensated reference voltage source. One approach which has been employed utilizes two strings of series-connected diodes to which separate, substantially constant currents are applied. The currents are selected so that the temperature coefficient of one string of diodes is equal to that of the other string while the voltages across the two strings of diodes are unequal. The difference voltage is developed by means of load resistors and/or a plurality of transistors arranged as a differential amplifier to provide a temperature compensated reference voltage. As noted above, in many instances, such as in the integrated circuit environment, the use of load resistors and a plurality of additional amplifier transistors for generating a reference voltage is undesirable since power and voltage limitations must be met in such instances.

In accordance with the present invention, a reference voltage source comprises a substantially constant current source and first and second current paths each including a plurality of semiconductor rectifier devices connected to the common current source. A current repeater circuit including a further semiconductor rectifier device couples the first plurality of devices to a reference terminal and is also coupled across the base-emitter junction of an associated transistor. The emitter-collector path of the transistor is connected between the reference terminal and the second plurality of devices. The transistor and associated rectifier are arranged to have proportionally related conduction characteristics such that proportional, substantially constant currents flow in the two paths. The current levels are selected such that the voltage difference produced across the two sets of rectifier devices appears between the collector of the transistor and the reference terminal as a temperature stabilized reference voltage.

Figure 2:
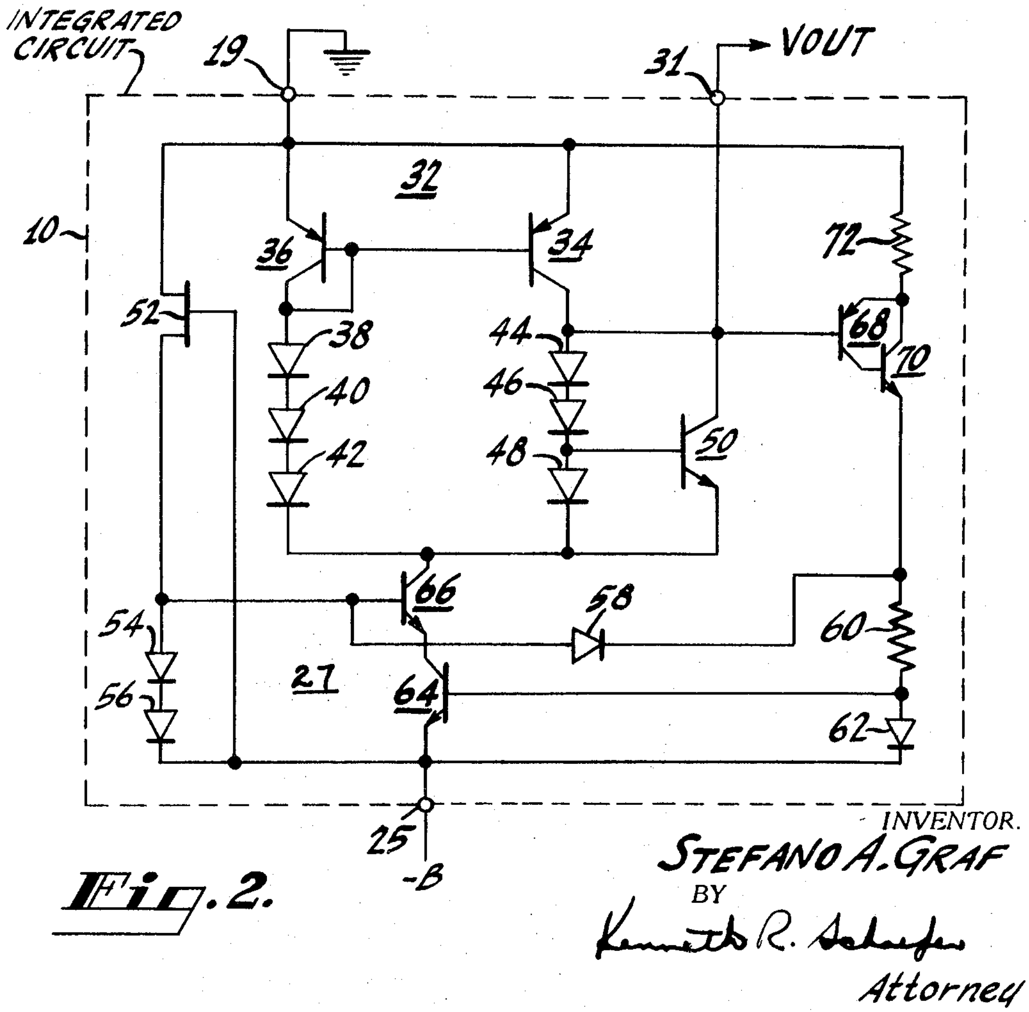

For a better understanding of the present invention, together with additional characteristics thereof, reference should be made to the following detailed description in conjunction with the accompanying drawings in which:

FIG. 1 is a schematic circuit diagram of a reference voltage source embodying the principles of the present invention; and FIG. 2 is a schematic circuit diagram of an alternate embodiment of the present invention.

Referring to the drawings, and more specifically to FIG. 1, a monolithic integrated circuit chip is indicated by the dotted line 10. A current repeater circuit 12 is arranged on the chip and includes a transistor 14 in a common emitter configuration and a diode 16 coupled across the base and emitter electrodes of the transistor 14.

The operation of such a current repeater circuit is explained in U.S. Pat. No. 3,531,730, granted Sept. 29, 1970 in the name of Steven A. Steckler and assigned to the same assignee as this invention. For purposes of the present invention it is sufficient to note that transistor 14 and diode 16 (which may be constructed as a transistor with collector shorted to base) have proportionally related conduction characteristics. This result may readily be achieved in integrated circuits by fabricating transistor 14 and diode 16 in close proximity to each other on chip 10 by identical processing steps. Currents in the two devices will be related by the ratio of their effective base-emitter junction areas.

The emitter electrode of the transistor 14 is coupled to a chip terminal 18 which, in turn, may be coupled to a common reference or ground, as is shown. Diode 16 is included in a first current path with additional series-connected diodes 18 and 20. For purposes of explanation diodes 18 and 20 will be considered to be similar in construction to diode 16 and may be diode-connected transistors as described above. The anode of diode 20 is coupled to a constant current source 22 which, in turn, is coupled to a chip terminal 24. Terminal 24 is adapted to be connected to a source of operating potential (B+).

A second current path is also provided between reference terminal 18 and constant source 22 and includes the collector-emitter path of transistor 14 and diodes 26 and 28. Diodes 26 and 28 may also be diode-connected transistors.

A reference terminal or output voltage ($V_o$) is provided between reference terminal 18 and the collector electrode of transistor 14, that collector electrode being coupled to an output terminal 30.

The operation of the embodiment shown in FIG. 1 may be understood from the following.

The voltage across the base-emitter junction of a diode-connected transistor at a given temperature and current may be calculated with the aid of the idealized semiconductor junction diode equation knowing the voltage across the base-emitter junction at a reference temperature and current.

$$V_{be}=V_{go}\left(1-\frac{T}{T_o}\right)+V_{beo}\frac{T}{T_o}+\frac{nkT}{q}\ln\frac{T_o}{T}+\frac{kT}{q}\ln\frac{I_c}{I_{co}} \qquad (1)$$

where;

$V_{go}$ = the extrapolated energy band gap for the semiconductor material at absolute zero (approximately 1.2 volts for silicon), $q$ = the charge of an electron, $n$ = a constant which depends on how the transistor is made, ($n$ has a typical value of 1.5 for double silicon transistors), $k$ = Boltzman's constant, $T$ = absolute temperature (°Kelvin), $I_c$ = collector current, $V_{beo}$ = the emitter-base voltage at $T_o$ and $I_{co}$; where $T_o$ and $I_{co}$ are the reference temperature and current respectively.

The value of $k/q$ is approximately $8.66\times10^{-5}$ volts/°K., and for a typical operating temperature of 300° K. (27° C.) the expression $kT/q$ may be approximated as 26 millivolts.

Taking the derivative of Equation (1) with respect to temperature provides an expression showing the temperature dependency of the base-emitter diode.

$$\frac{dV_{be}}{dT}=-\frac{V_{go}}{T_o}+\frac{V_{beo}}{T_o}-\left(1+\ln\frac{T}{T_o}\right)\frac{nk}{q}+\left(\ln\frac{I_c}{I_{co}}\right)\frac{k}{q} \qquad (2)$$

The last two terms of Equation (2) are at least an order of magnitude smaller than the first two terms of Equation (2) and may be neglected in this analysis so that Equation (2) becomes:

$$\frac{dV_{be}}{dT}=-\frac{V_{go}+V_{beo}}{T_0}=\Delta V_{be} \qquad (3)$$

Referring again to FIG. 1, assuming diodes 16, 18 and 20 are substantially identical in construction and their currents are substantially identical (base current of transistor 14 being negligible) substantially equal voltages ($V_{beo(1)}$) exist across each of the diodes 16, 18 and 20. In order to obtain a temperature stabilized voltage at output terminal 30, the sum of the temperature coefficients of diodes 26 and 28 should be equal to the sum of the temperature coefficients of diodes 16, 18 and 20. This result may be accomplished by, for example, selecting diodes 26 and 28 different from diodes 16, 18 and 20 or by using similar diodes but providing different currents in the first and second current paths. The latter may readily be accomplished by making diode 16 with a larger base-emitter junction area than transistor 14. It will be assumed that diode 16 is larger than transistor 14 in the following discussion. The current in diodes 26 and 28 will therefore be less than, but proportional to, the current in diodes 16, 18 and 20. In that case, diode voltages ($V_{beo(2)}$) equal to each other but different from $V_{beo(1)}$ exist across each of the diodes 26 and 28 in the second current path. The output voltage ($V_o$) appearing between output terminal 30 and reference terminal 18 then may be expressed as:

$$V_o=3V_{beo(1)}-2V_{beo(2)} \quad (4)$$

The temperature coefficient of the output voltage ($V_o$) may then be expressed as:

$$\Delta V_o=3\,\Delta V_{be(1)}-2\Delta V_{be(2)} \quad (5)$$

Substituting Equation (3) into Equation (5) yields:

$$\Delta V_o=\frac{-3V_{go}+3V_{beo(1)}+2V_{go}-2V_{beo(2)}}{T_o} \quad (6)$$

Combining terms yields:

$$\Delta V_o=\frac{-V_{go}+3V_{beo(1)}-2V_{beo(2)}}{T_o} \quad (7)$$

Substituting Equation (4) into Equation (7) yields:

$$\Delta V_o=\frac{-V_{go}+V_o}{T_o} \quad (8)$$

Equation (8) shows that the change in output voltage with respect to temperature will be reduced to substantially zero if the output voltage ($V_o$) in the illustrated configuration is made equal to the band gap voltage ($V_{go}$), which is approximately 1.2 volts for silicon semiconductor material. Considering a more general case, it may be shown, following the analysis above, that when utilizing diodes of the same material (e.g., silicon) in each current path, compensated reference voltages can be obtained at substantially integral multiples of the band gap voltage of the material. The particular multiple is determined by the difference in the number of diodes (rectifiers) in the two paths.

Referring now to FIG. 2 a second embodiment of the present invention is shown arranged on an integrated circuit chip indicated by the dotted line 10. A current repeater circuit 32 includes a transistor 34 and a diode-connected transistor 36. The emitter electrodes of transistors 34 and 36 are connected to a ground reference terminal 19.

The commonly connected collector and base electrodes of transistor 36 are coupled by a first current path, including diodes 38, 40 and 42, which also may be diode-connected transistors as described above, to a constant current source indicated generally by the reference numeral 27, details of which will be set forth below.

A second current path, which includes the emitter and collector electrodes of transistor 34 and a plurality of diodes 44, 46 and 48, which also may be diode-connected transistors, is coupled between the reference terminal 19 and the constant current source 27.

The collector-emitter path of a transistor 50 is coupled between the collector of transistor 34 and constant current source 27. The base-emitter junction of transistor 50 is connected directly across diode 48 and is poled in the same direction as diode 48. Transistor 50 and diode 48 are arranged to exhibit proportional conduction characteristics (e.g., transistor 50 has an effective base-emitter area 12 times that of diode 48).

The constant current source 27 comprises cascode-connected transistors 64 and 66 connected between the joined first and second current paths and a source of operating potential (−B) coupled to terminal 25. The base-emitter junction of transistor 64 (the lower transistor of the cascode pair) is connected in parallel with a diode 62 in a further current repeater configuration. A substantially constant operating current is produced in diode 62 (and thereby in transistor 64) by coupling opposite conductivity amplifier transistors 68 and 70 to the stabilized voltage at terminal 31. A resistor 72 is coupled between the emitter of transistor 68 and terminal 19 and a further coupling resistor 60 is provided between the emitter of transistor 70 and diode 62.

Bias is provided to the base of transistor 66 (the upper transistor of the cascode arrangement) by means of diodes 54 and 56 connected between terminal 25 and the base of transistor 66. A starting current circuit comprising a substrate transistor 52 and a diode 58 is coupled to diodes 54, 56 and to resistor 60.

The desired constant current provided by source 27 is provided in the FIG. 2 embodiment making use of the temperature stabilized voltage provided at terminal 31. This voltage is applied to the base of transistor 68 (which with transistor 70 provides a composite PNP transistor as is well known). A substantially constant current is produced in emitter resistor 72 and is coupled via resistor 60 to diode 62. A corresponding current is coupled via transistor 64 and common base transistor 66 to the diode current paths of the reference voltage supply. Current is supplied to bias diodes 54 and 56 via the source-drain path of device 52. The substrate electrode of device 52 is connected to terminal 25 so that device 25 is biased for conduction. Initially, current is also supplied via diode 58 to start current flow in diode 62 and transistor 64. However, in normal operation, diode 58 is reverse biased and does not contribute to the current in diode 62.

In one arrangement such as is shown in FIG. 2, the desired temperature compensated difference in voltage between terminals 19 and 31 may be obtained by fabricating diode-connected transistor 36 with an effective base-emitter area five times that of transistor 34 (i.e., current of diode 36 is five times that of transistor 34). In that arrangement diodes 38, 40 42, 44 and 48 are substantially identical to each other. Transistor 50 is similar to but has an effective base-emitter area eleven times that of diode 48. Diode 46 is fabricated similar to diode 48 but has an effective base-emitter area six times that of diode 48.

It can thus be seen that the current in the diodes 38, 40, 42 and 36 will be substantially five-sixths the current supplied by source 27. The collector current of transistor 34 will be one-sixth that of source 27. Of the collector current of transistor 34, eleven parts (i.e., eleven-twelfths) will flow in transistor 50 while one part will flow in diodes 44, 46 and 48. The current in diodes 38, 40, 42 and 36 in such an arrangement would be substantially 60 times that in diodes 44, 46 and 48. Furthermore, since diode 46 is six times the area of the other diodes in that path, its current density will be one-sixth that of diodes 44 and 48. The voltage across diode 46 will be correspondingly lower according to the diode equation. The combined effect of the differences in area of the various devices and the reduced current in the second path provides the desired stabilized output voltage of approximately 1.2 volts at terminal 31.

The above-described arrangement advantageously utilizes the characteristics of integrated circuits. That is, the illustrated devices may be readily fabricated by a series of standard processing steps without the need for special doping of materials to obtain differences between the voltages across the diodes in the two current paths.

It is to be noted that the operating potential applied to terminal 25 in FIG. 2 is negative with respect to ground terminal 18 thereby providing a negative output reference voltage between terminals 31 and 19. The operating potential applied to terminal 24 of FIG. 1 is positive thereby providing a positive reference voltage between terminals 30 and 18. The configurations shown in FIGS. 1 and 2 are not limited to the voltages shown and either may be used with appropriately connected positive or negative sources of potential. Similarly, modifications to the types (NPN or PNP) of the diode-connected transistors and their interconnections may be made. Various additional modifications may also be made within the scope of this invention.

Although, in the FIG. 1 embodiment, the value of $V_{beo(1)}$ for each of the diodes in the first current path and the value of $V_{beo(2)}$ for each of the diodes in the second current path were assumed to be equal to simplify the mathematical derivation, the results would be the same if each of the diodes in the first and second current paths had different voltages ($V_{beo}$) across them. Another way to express the output or reference voltage is: $V_o = V_{beo(1)} + V_{beo(1)} - V_{beo(2)} + \ldots + V_{beo(1)} - V_{beo(2)}$ (9)

where;

$V_{beo(1)}$ = the voltage across the diode connected across the base-emitter electrode of the transistor in the first current path, and $V_{beo(1)_n} - V_{beo(2)_n}$, etc. = the differences in voltage between the additional diodes in the first and second current paths.

It should also be noted that the above-described arrangements each utilize series-connected active devices between the supply terminals. The circuits are relatively insensitive to supply voltage variations. Furthermore, because of the absence of resistors in the output voltage determining circuits, dissipation is relatively low. Only a relatively low-supply potential is required.

What is claimed is:

1. A reference voltage source comprising:

a substantially constant current source, first and second current paths each including a plurality of semiconductor rectifier devices connected in series relation to said source, said rectifier devices being poled in a forward bias direction with respect to said source, means including a further semiconductor rectifier device coupling said first current path to a reference terminal for providing a first voltage between said current source and said reference terminal equal to the sum of forward bias voltages across said rectifier devices in said first path and a transistor having base and emitter electrodes connected across said further device and an emitter-collector circuit coupling said second current path to said reference terminal for providing a second voltage between said current source and said collector equal to the sum of forward bias voltages across said rectifier devices in said second path, said transistor and further device having proportionally related conduction characteristics for establishing substantially constant, proportionally related currents through said first and second paths at levels so as to produce, between said collector and said reference terminal, a temperature stabilized reference voltage equal to the difference between said first and second voltages.

2. A reference voltage source according to claim 1 wherein:

said first and second currents are selected such that the summation of changes in voltage as a function of temperature of said rectifier devices in said first path is substantially equal to the summation of changes in voltage as a function of temperature of said rectifier devices in said second path.

3. A reference voltage source according to claim 2 wherein:

said current source is arranged to provide said constant current substantially independent of operating temperature.

4. A reference voltage source according to claim 2 wherein:

the number of rectifier devices in said first path, including said further device, is greater than the number of rectifier devices in said second path.

5. A reference voltage source according to claim 2 wherein:

all of said rectifier devices are fabricated of like material, said reference voltage is substantially equal to *n* times the band gap voltage for said material, where *n* is the difference between the number of devices in said first and second paths.

6. A reference voltage source according to claim 5 and further comprising:

a second transistor having base and emitter electrodes coupled across one of said rectifier devices of said second path and having proportionally related conduction characteristics with respect to said one device, and a collector electrode connected to another of said rectifier devices in said second path for diverting current from said second path.

7. A reference voltage source according to claim 6 wherein:

said transistor and further rectifier device are fabricated as transistors of one type conductivity and said second transistor and remaining rectifier devices are fabricated as like transistors of opposite type conductivity, each said rectifier device having a collector electrode shorted to a base electrode.

8. A reference voltage source according to claim 2 wherein:

said transistor and said further device are related such that collector current of said transistor is a predetermined fraction of current in said further device.

9. A reference voltage source according to claim 8 wherein:

said reference terminal is connected to ground potential, and said current source is coupled to a source of operating potential.

10. A reference voltage source according to claim 9 and further comprising:

means for coupling said current source to said collector electrode to provide a temperature stabilized current from said source.

* * * * *

UNITED STATES PATENT OFFICE
CERTIFICATE OF CORRECTION

Patent No. 3,648,153 Dated March 7, 1972

Inventor(x) Stefano Arturo Graf

It is certified that error appears in the above-identified patent and that said Letters Patent are hereby corrected as shown below:

Column 1, line 5, "suitable for on a ..." should read -- suitable for fabrication on a ... --.

Column 5, Equation 9,

"$V_o = V_{beo(1)} + V_{beo(2)} - V_{beo(2)} + \cdots\cdots + V_{beo(1)} - V_{beo(2)}$ (9)"

should read

-- $V_o = V_{beo(1)} + V_{beo(1)_2} - V_{beo(2)_2} + \cdots\cdots + V_{beo(1)_n} - V_{beo(2)_n}$ (9) --.

Signed and sealed this 17th day of October 1972.

(SEAL)
Attest:

EDWARD M.FLETCHER,JR.
Attesting Officer

ROBERT GOTTSCHALK
Commissioner of Patents